(12) United States Patent
Sim

(10) Patent No.: US 10,447,024 B2
(45) Date of Patent: Oct. 15, 2019

(54) CURRENT CIRCUIT BREAKER

(71) Applicant: LSIS CO., LTD., Gyeonggi-do (KR)

(72) Inventor: Jung-Wook Sim, Gyeonggi-do (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 227 days.

(21) Appl. No.: 15/383,014

(22) Filed: Dec. 19, 2016

(65) Prior Publication Data

US 2017/0288395 A1    Oct. 5, 2017

(30) Foreign Application Priority Data

Apr. 4, 2016   (KR) .................. 10-2016-0041254

(51) Int. Cl.
| | |
|---|---|
| *H02H 3/087* | (2006.01) |
| *H01H 33/59* | (2006.01) |
| *H01H 9/54* | (2006.01) |
| *H02H 9/02* | (2006.01) |

(52) U.S. Cl.
CPC ............. *H02H 3/087* (2013.01); *H01H 9/54* (2013.01); *H01H 9/548* (2013.01); *H01H 33/59* (2013.01); *H01H 33/596* (2013.01); *H02H 9/02* (2013.01); *H01H 2009/543* (2013.01)

(58) Field of Classification Search
CPC .... H02H 3/087; H01H 33/593; H01H 33/596; H01H 9/54–56
See application file for complete search history.

(56) References Cited

U.S. PATENT DOCUMENTS

2010/0254046 A1*  10/2010  Liu ................. H01H 9/542
                                              361/8
2015/0002977 A1   1/2015  Dupraz et al.
(Continued)

FOREIGN PATENT DOCUMENTS

| CN | 102237668 A | 11/2011 |
|---|---|---|
| CN | 102687221 A | 9/2012 |

(Continued)

OTHER PUBLICATIONS

European Search Reports dated Jun. 23, 2017 corresponding to application No. 16204065.3-1808.

(Continued)

*Primary Examiner* — Ronald W Leja
*Assistant Examiner* — Christopher J Clark
(74) *Attorney, Agent, or Firm* — K&L Gates LLP

(57) ABSTRACT

Disclosed herein is a current circuit breaker that protects a semiconductor module by using fast switches to block a current. The current circuit breaker includes: a first switch configured to be opened upon a fault current being generated; a second switch connected to the first switch and configured to be opened after a predetermined period of time elapses since the first switch has been opened; a semiconductor module having an end connected to the first switch and another end connected to the second switch; a capacitor having a terminal connected to the second switch and the other terminal connected to the semiconductor module; and a surge arrester connected across the capacitor and configured to change its resistance according to a voltage across the capacitor to block the fault current.

5 Claims, 9 Drawing Sheets

(56) References Cited

U.S. PATENT DOCUMENTS

| | | | |
|---|---|---|---|
| 2015/0022928 A1* | 1/2015 | Mohaddes Khorassani | ............... H02H 3/087 361/93.7 |
| 2016/0285250 A1* | 9/2016 | Lee | ........................ H01H 9/54 |
| 2016/0300671 A1* | 10/2016 | Ergin | .................. H01H 33/596 |

FOREIGN PATENT DOCUMENTS

| | | |
|---|---|---|
| CN | 103681039 A | 3/2014 |
| EP | 0 660 352 B1 | 3/1998 |
| JP | 2000-90787 A | 3/2000 |
| JP | 2011233517 A | 11/2011 |
| JP | 2012119104 A | 6/2012 |
| JP | 2012248445 A | 12/2012 |
| JP | 2014038775 A | 2/2014 |
| JP | 2014241187 A | 12/2014 |
| JP | 2015-195116 A | 11/2015 |
| KR | 10-2014-0095184 A | 8/2014 |
| WO | 2011057675 A1 | 5/2011 |
| WO | 2015/053484 A1 | 4/2015 |
| WO | 2015053484 A1 | 4/2015 |
| WO | 2015078525 A1 | 6/2015 |

OTHER PUBLICATIONS

Chinese Office Action for related Chinese Application No. 201611237055.X; action dated Jun. 28, 2018; (7 pages).

Japanese Notice of Allowance for related Japanese Application No. 2016-243567; action dated Jun. 5, 2018; (3 pages).

Japanese Office Action for related Japanese Application No. 2016-243567; action dated Nov. 7, 2017; (3 pages).

\* cited by examiner

- Prior Art -

CURRENT CIRCUIT BREAKER

CROSS REFERENCE TO RELATED APPLICATION

This application claims the benefit of Korean Patent Application No. 10-2016-0041254, filed on Apr. 4, 2016, entitled "CURRENT CIRCUIT BREAKER", which is hereby incorporated by reference in its entirety into this application.

BACKGROUND

1. Technical Field

The present disclosure relates to a current circuit breaker.

2. Description of the Related Art

A current circuit breaker refers to a device that opens/closes a load in a transmission/transformation system or an electric circuit, or interrupts current when an accident such as grounding or short-circuit occurs. If the blocking part of the current circuit breaker is made of an insulating material, a line in a normal use may be opened/closed manually. In addition, a current circuit breaker may open/close remotely by using an electric operation device or the like outside the metal case, and may interrupt a line automatically at the time of overload or short-circuit to thereby protect a power system and a load device.

FIG. 1 is a view showing an existing current circuit breaker 10. The operation of the current circuit breaker 10 will be described with reference to FIG. 1. When a steady-state current flows, a switch 12 is closed and the current flows through a power semiconductor 11 of a main circuit. In addition, when the steady-state current flows, a semiconductor module 13 is turned off, such that no current flows through the semiconductor module 13. The semiconductor module 13 may be a combination of a plurality of power semiconductors 11.

When a high-voltage direct current transmission line or power line has to be repaired or replaced, or when a fault current flows therein, the semiconductor module 13 is turned on to interrupt the current. When the semiconductor module 13 is turned on, the power semiconductor 11 of the main circuit is turned off and the switch 12 is opened. When the switch 12 is opened, the fault current flows through the semiconductor module 13, and then the semiconductor module 13 is turned off to block the fault current.

Referring to FIG. 1, the existing current circuit breaker 10 requires the plurality of power semiconductors 11 for blocking current. Accordingly, there is a problem in that a lot of costs are incurred to block the current in the existing current circuit breaker 10. In addition, there is another problem in that the existing current circuit breaker 10 has a large volume due to the plurality of power semiconductors 11. In addition, there is yet another problem in that the existing current circuit breaker 10 requires a cooling device as the power semiconductors 11 generates heat.

SUMMARY

It is an object of the present disclosure to provide a current circuit breaker that protects a semiconductor module by using fast switches to block a current.

It is another object of the present disclosure to provide a current circuit breaker capable of reduce the number of power semiconductors by using a bypass circuit to block a current.

It is yet another object of the present disclosure to provide a current circuit breaker capable of reducing the volume of the current circuit breaker and saving manufacturing cost by using a bypass circuit to block a current.

It is still another object of the present disclosure to provide a current circuit breaker capable of suppressing heat generation by using a bypass circuit to block a current.

In accordance with one aspect of the present disclosure, a current circuit breaker includes: a first switch configured to be opened upon a fault current being generated; a second switch connected to the first switch and configured to be opened after a predetermined period of time elapses since the first switch has been opened; a semiconductor module having an end connected to the first switch and another end connected to the second switch; a capacitor having a terminal connected to the second switch and the other terminal connected to the semiconductor module; and a surge arrester connected across the capacitor and configured to change its resistance according to a voltage across the capacitor to block the fault current.

According to an exemplary embodiment of the present disclosure, the fast switches are used to block a current, and thus the semiconductor module can be protected.

In addition, according to an exemplary embodiment of the present disclosure, the number of power semiconductors can be reduced by using a bypass circuit to block a current.

In addition, according to the exemplary embodiment of the present disclosure, by utilizing the bypass circuit to block the current, the volume of the current circuit breaker can be reduced and the manufacturing cost can be reduced.

In addition, according to an exemplary embodiment of the present disclosure, heat generation can be suppressed by using the bypass circuit to block a current.

DETAILED DESCRIPTION

Figure 1:
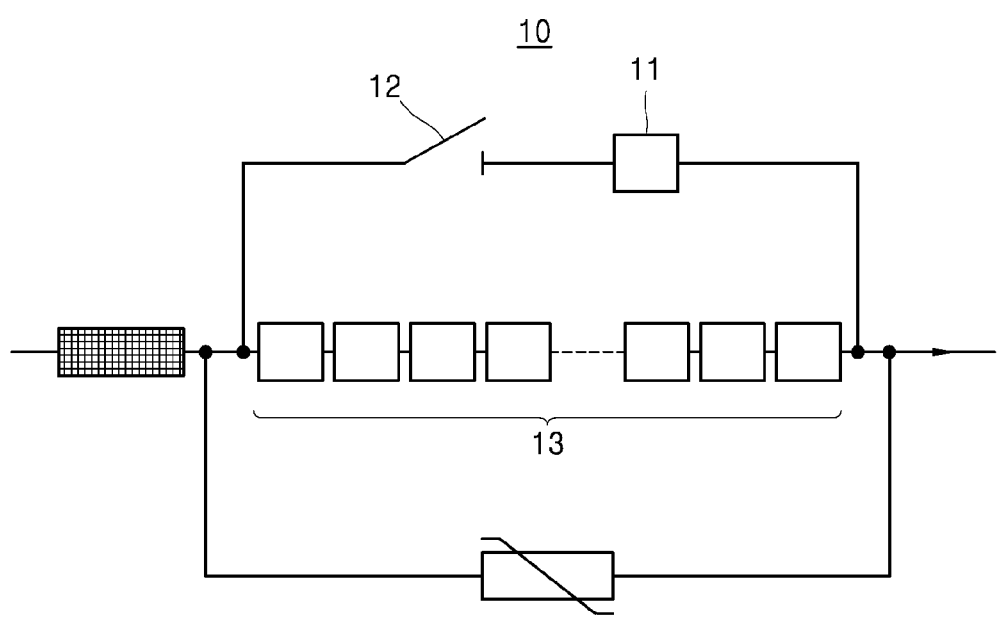
FIG. 1 is a view showing an existing current circuit breaker.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
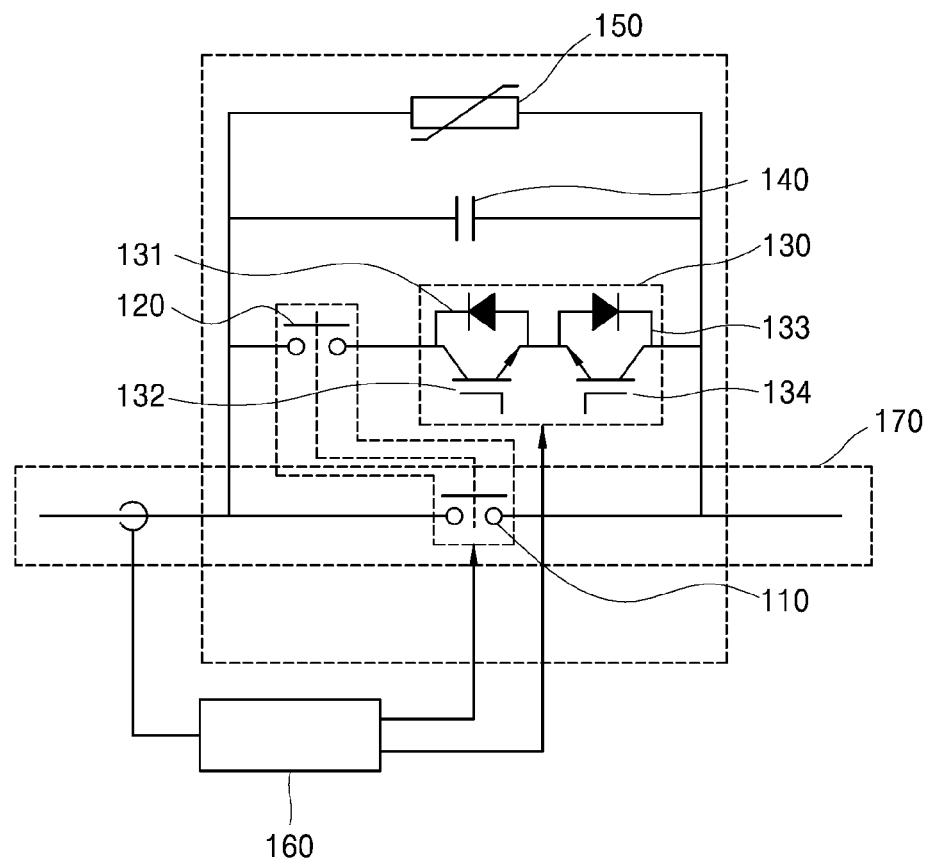
FIG. 2 is a diagram of a current circuit breaker according to an exemplary embodiment of the present disclosure.
Figure 3:
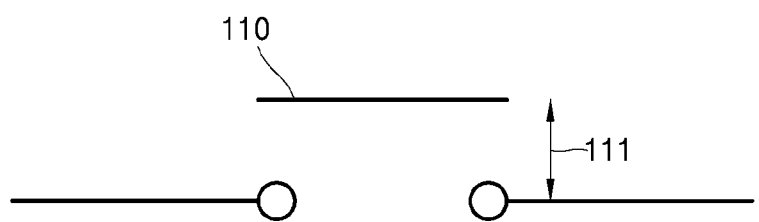
FIG. 3 is a diagram showing a first switch and a stroke according to an exemplary embodiment of the present disclosure.
Figure 4:
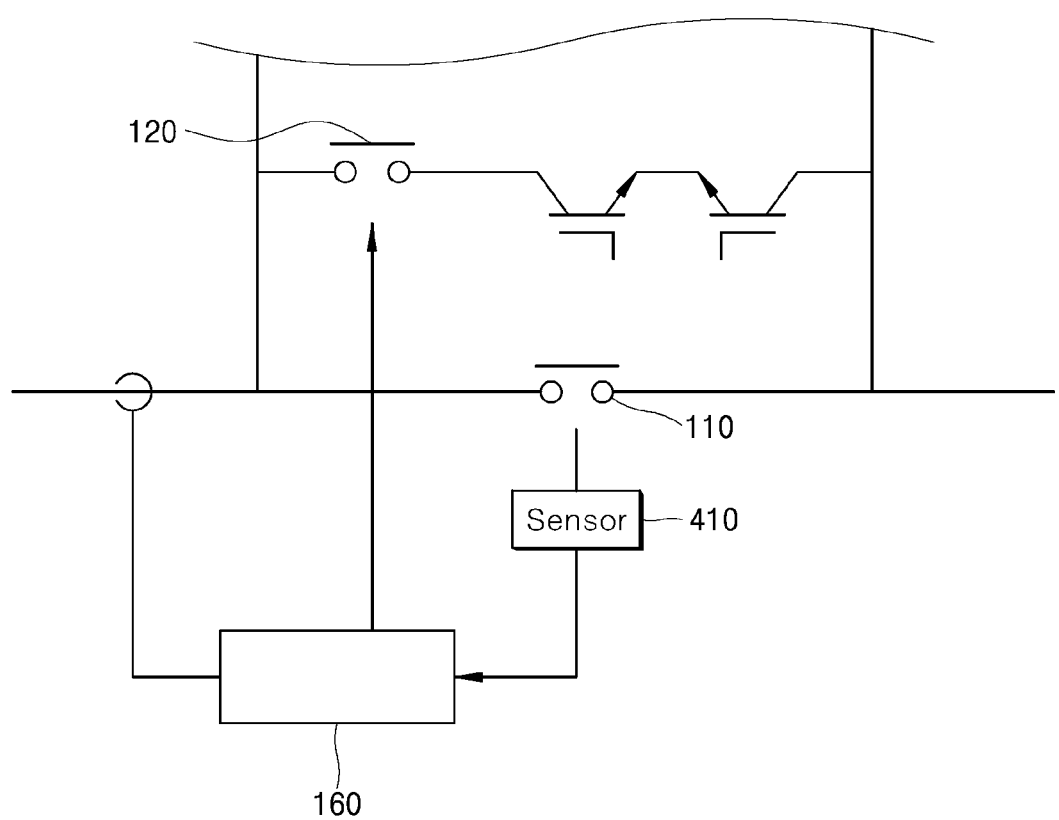
FIG. 4 is a diagram showing the second switch opened by the control unit when the first switch is completely opened.

FIG. 2 is a diagram of a current circuit breaker 100 according to an exemplary embodiment of the present disclosure. Referring to FIG. 2, the current circuit breaker 100 according to the exemplary embodiment may include a first switch 110, a second switch 120, a semiconductor module 130, a capacitor 140, a surge arrester 150, and a control unit 160. The current circuit breaker 100 shown in FIG. 2 is merely an exemplary embodiment of the present disclosure, and the elements are not limited to those shown in FIG. 2. Some elements may be added, modified or eliminated as desired. FIG. 3 is a diagram showing the first switch 110 and a stroke 111 according to an exemplary embodiment of the present disclosure. FIG. 4 is a diagram showing the second switch opened by the control unit when the first switch is completely opened. Hereinafter, the current circuit breaker 100 according to the exemplary embodiment of the present disclosure will be described in detail with reference to FIGS. 2 to 4.

When a fault current is generated, the first switch 100 may be opened. The first switch 110 may be a fast switch and may open or short the terminals of a main circuit 170 depending on whether a fault current flows or a steady-state current flows. That is, the first switch 110 is opened when a fault current flows in the main circuit 170 and is closed when a steady-state current flows in the main circuit 170. The fault current is generated when a high-voltage direct current transmission line or power line is repaired or replaced and may have a value larger than the steady-state current.

The second switch 120 may be connected to the first switch 110. The second switch 120 may be a fast switch. The second switch 120 and the first switch 110 may be of the same type. The second switch 120 may be opened after a predetermined period of time has elapsed since the first switch 110 is opened. The predetermined period of time may be set by a user or set by the control unit automatically.

For example, the second switch 120 may be opened to block fault current when the semiconductor module 130 is turned on. That is, when the fault current flows through the main circuit 170, the first switch 110 is opened, and the semiconductor module 130 is turned on. When the semiconductor module 130 is turned on, the fault current flows through the semiconductor module 130. Meanwhile, the second switch 120 is opened such that the fault current flowing through a bypass circuit can be blocked. After the second switch 120 is opened, the semiconductor module 130 is turned off, which will be described in detail below.

The predetermined period of time may be in proportion to the stroke 111 of the first switch 110. The stroke 111 refers to a distance by which the first switch 110 moves. In FIG. 3, it refers to the distance 111. For example, the longer the stroke 111 of the first switch 110 is, the later the second switch 120 may be opened since the first switch 110 is opened. In addition, the shorter the stroke 111 of the first switch 110 is, the earlier the second switch 120 may be opened since the first switch 110 is opened.

One end of the semiconductor module 130 may be connected to the first switch 110 and the other end thereof may be connected to the second switch 120. The semiconductor module 130 may be turned on when the first switch 110 is opened and the second switch 120 is closed to allow the fault current to flow, and may include at least one diode and at least one transistor. In addition, the semiconductor module 130 may be turned off after the second switch 120 is opened to allow the fault current to flow to the capacitor 140. The capacitor may be, but is not limited to, a MOSFET, a BJT, an IGBT, etc.

According to an exemplary embodiment of the present disclosure, the semiconductor module 130 may include a first diode 131 and a second diode 133 opposed to each other. In addition, the semiconductor module 130 may include a first transistor 132 connected across the first diode 131 in the opposite direction, and a second transistor 134 connected across the second diode 133 in the opposite direction. The configuration of the semiconductor module 130 shown in FIG. 2 is for controlling a fault current flowing in two directions.

For example, when a fault current flows from left to right, the fault current flows through the second switch 120, the first transistor 132 and the second diode 133. On the other hand, when a fault current flows from right to left, the fault current flows through the second transistor 134, the first diode 131 and the second switch 120.

The bypass circuit includes the second switch 120 and the semiconductor module 130. According to the exemplary embodiment of the present disclosure, the bypass circuit is used to block current to thereby reduce the number of power semiconductors. In addition, according to the exemplary embodiment of the present disclosure, by utilizing the bypass circuit to block the current, the volume of the current circuit breaker 100 can be reduced and the manufacturing cost can be reduced.

One terminal of the 140 may be connected to the second switch 120 and the other terminal thereof may be connected to the semiconductor module 130. According to an exemplary embodiment of the present disclosure, when the second switch 120 is opened and the semiconductor module 130 is turned off, a fault current may flow in the capacitor 140. In addition, when the semiconductor module 130 is turned off and the second switch 120 is opened, a fault current may flow in the capacitor 140. When a fault current flows in the capacitor 140, the capacitor 140 may be charged with the fault current. When the capacitor 140 is charged, the voltage across the capacitor 140 may have a certain value, e.g., 100 V.

The surge arrester 150 may be connected across the capacitor 140 and may block a fault current by changing the resistance according to the voltage across the capacitor 140. The resistance of the surge arrester 150 becomes infinite ($\infty$) when the voltage applied across it is below a predetermined level, and becomes zero when the voltage applied across it is above the predetermined value. By utilizing such feature, a fault current can be blocked.

For example, the surge arrester 150 may increase the resistance if the voltage across the capacitor 140 is below a predetermined value to thereby open the terminals of the capacitor 140. In addition, the surge arrester 150 may decrease the resistance if the voltage across the capacitor 140 is above a predetermined value to thereby short the terminals of the capacitor 140. The predetermined value may be 100 V. When the terminals of the capacitor 140 are open, a fault current does not flow through the surge arrester 150. When the terminals of the capacitor 140 are shorted, a fault current flows through the surge arrester 150.

The control unit 160 determines whether a fault current is generated. If it is determined that a fault current is generated, the control unit 160 may generate a control signal to open the first or second switch. The control unit 160 may determine whether is a fault current flows or a steady-state current flows based on the magnitude of the current flowing in the main circuit 170. For example, if the magnitude of a current is constant, the current is determined as a steady-state current. If the magnitude of a current is increasing, the current is determined as a fault current. In addition, the control unit 160 may generate a control signal to open or close the first switch 110 and the second switch 120, and may turn on or turn off the semiconductor module 130.

The current circuit breaker 100 according to an exemplary embodiment of the present disclosure may further include a sensor 410 to detect if the first switch 110 is open. The control unit 160 may receive a signal from the sensor 410 which indicates that the first switch 110 is completely open and then generate a control signal to open the second switch 120. The signal indicating that the first switch 110 is completely open is generated when the stroke 11 shown in FIG. 3 is the maximum. Referring to FIG. 4, the control unit 160 may generate the control signal after the first switch 110 is completely open to open the second switch 120. By doing so, the control unit 160 may control the open time of the first switch 110 and the open time of the second switch 120.

Figure 5:
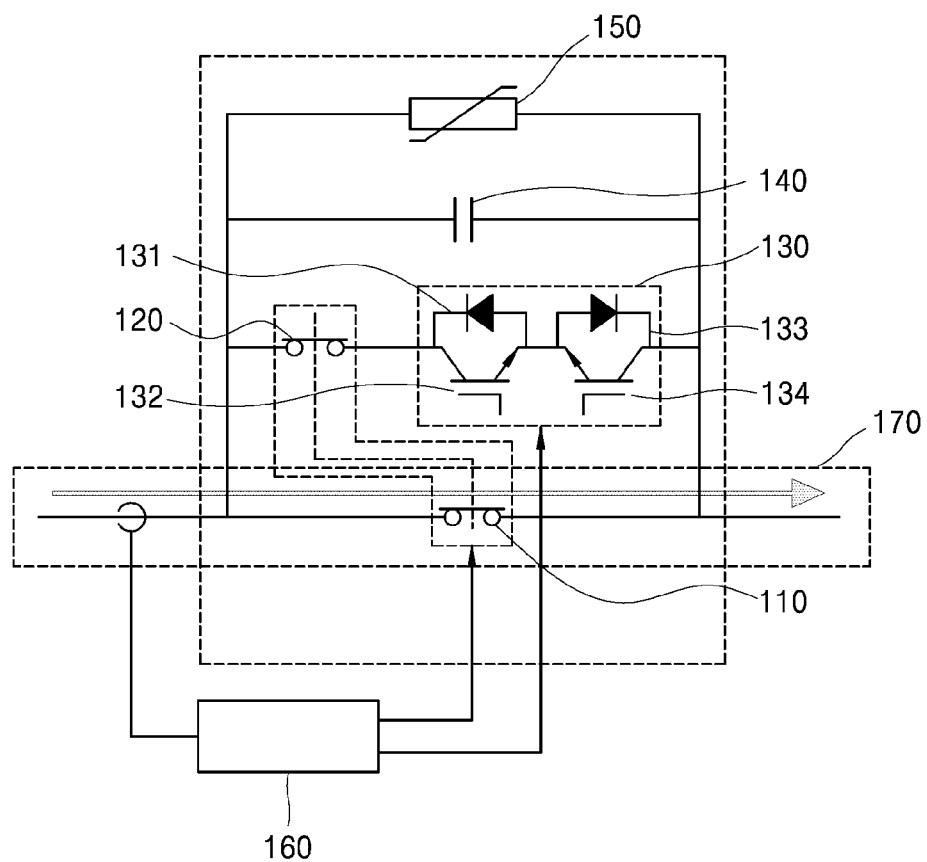
FIG. 5 is a diagram showing the current circuit breaker according to an exemplary embodiment of the present disclosure when a steady-state current is flowing in the main circuit.
Figure 6:
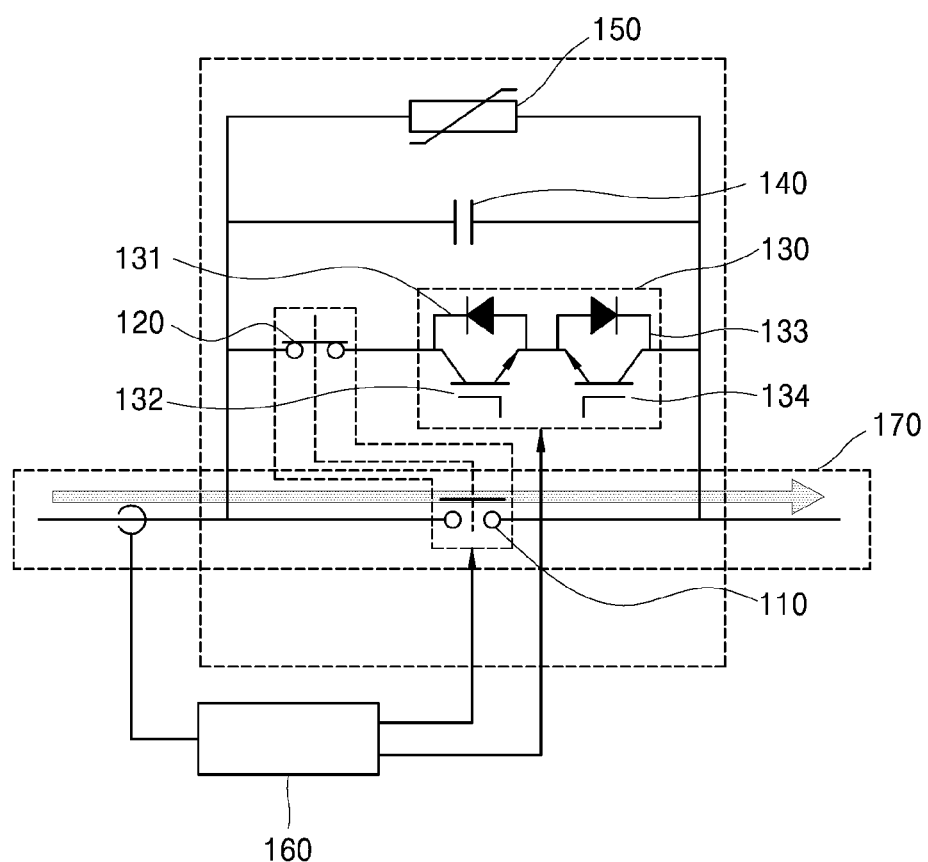
FIG. 6 is a diagram showing the current circuit breaker according to an exemplary embodiment of the present disclosure when a fault current is flowing in the main circuit.

FIG. 5 is a diagram showing the current circuit breaker 100 according to an exemplary embodiment of the present disclosure when a steady-state current is flowing in the main circuit 170. FIG. 6 is a diagram showing the current circuit breaker 100 according to the exemplary embodiment of the present disclosure when a fault current is flowing in the main circuit 170.

Figure 7:
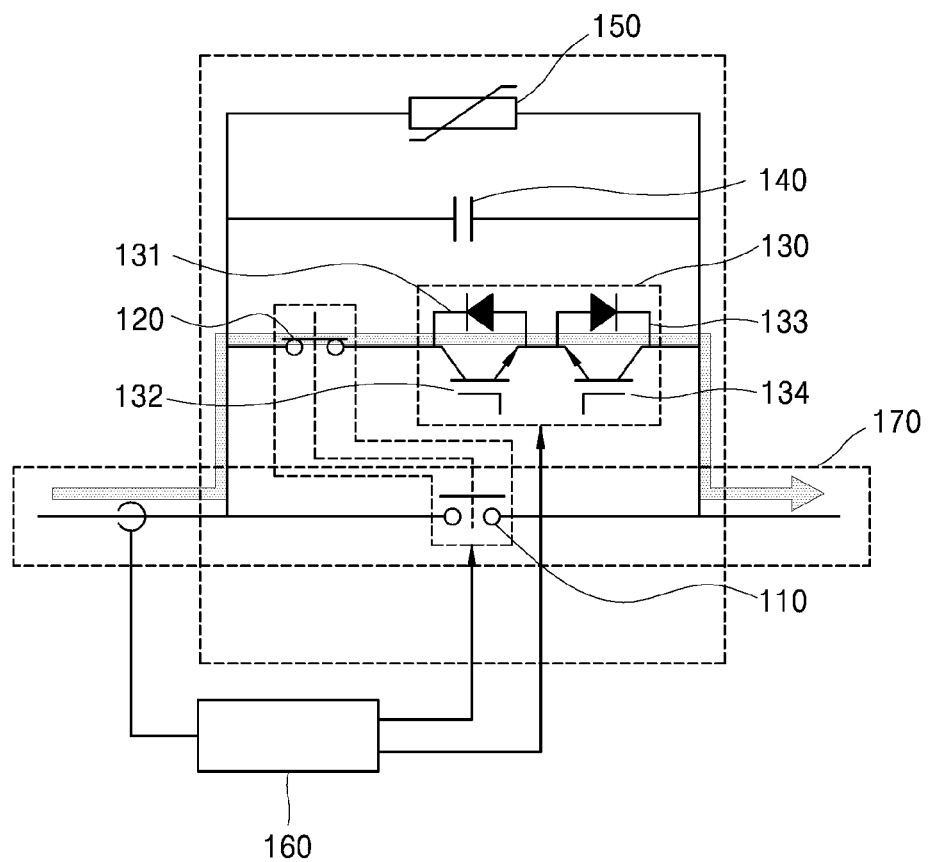
FIG. 7 is a diagram showing the current circuit breaker according to the exemplary embodiment of the present disclosure when a fault current flows in a second switch and a semiconductor module.
Figure 8:
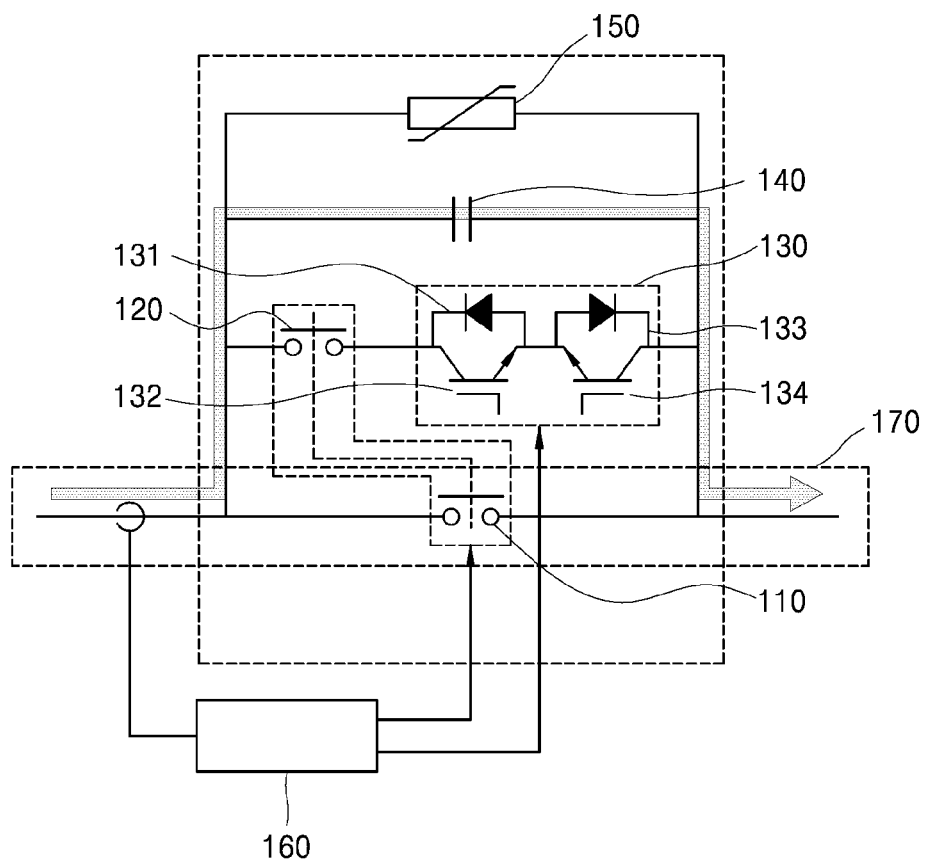
FIG. 8 is a diagram showing the current circuit breaker according to an exemplary embodiment of the present disclosure when a fault current is flowing in a capacitor.

FIG. 7 is a diagram showing the current circuit breaker 100 according to the exemplary embodiment of the present disclosure when a fault current flows in the second switch 120 and the semiconductor module 130. FIG. 8 is a diagram showing the current circuit breaker 100 according to the exemplary embodiment of the present disclosure when a fault current is flowing in the capacitor 140.

Figure 9:
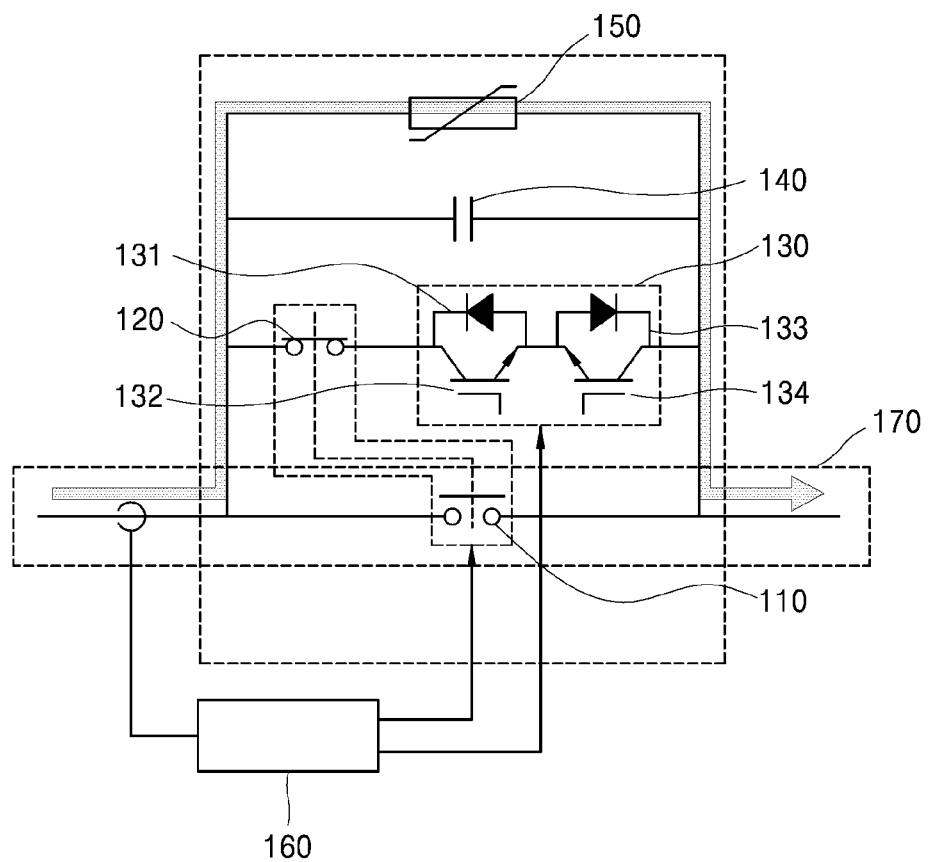
FIG. 9 is a diagram showing the current circuit breaker according to an exemplary embodiment of the present disclosure when a fault current is flowing in a surge arrester.
Figure 10:
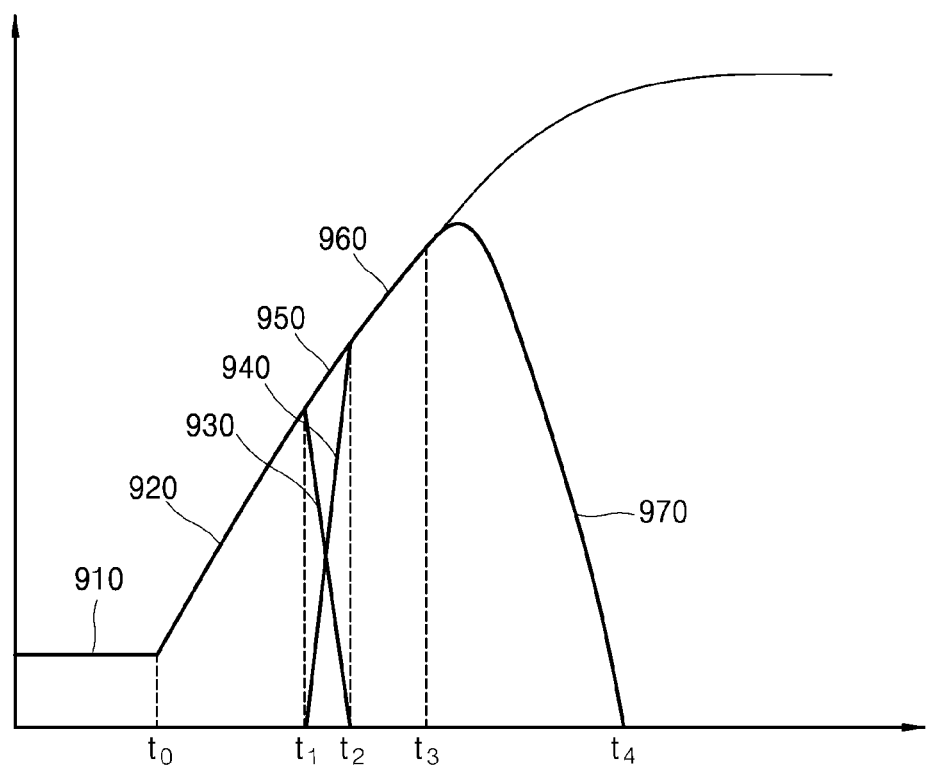
FIG. 10 is a graph showing the magnitude of a fault current according to an exemplary embodiment of the present disclosure.

FIG. 9 is a diagram showing the current circuit breaker 100 according to the exemplary embodiment of the present disclosure when a fault current is flowing in the surge arrester 150. FIG. 10 is a graph showing the magnitude of a fault current according to an exemplary embodiment of the present disclosure. Hereinafter, a process of blocking a current by the current circuit breaker 100 according to an exemplary embodiment of the present disclosure will be described in detail with reference to FIGS. 5 to 10.

Referring to FIGS. 5, 6 and 10, the first switch 110 is closed, and a steady-state current flows in the main circuit 170 via the first switch 110. The control unit 160 may monitor continuously the magnitude of the current flowing in the main circuit 170 to determine whether the current is a fault current or a steady-state current. If it is determined that the current is a fault current, the control unit 160 may open the first switch 110. The control unit 160 may determine whether the current is a fault current or a steady-state current based on the magnitude of the current. In the example shown in FIG. 10, the magnitude of the current is constant until time t0 and increases after time t0, and thus it may be determined that a fault current is generated.

If it is determined that a fault current is generated, the first switch 110 is opened, and then the semiconductor module 130 is turned on. When the semiconductor module 130 is turned on, the fault current may pass through the bypass circuit. It to be noted that even though the first switch 110 is open after it is determined that the fault current is generated, the entire fault current does not flow through the bypass circuit. Specifically, an arc current flows in the main circuit 170 and the fault current except the arc component flows in the bypass circuit. Referring to FIG. 10, a curve 930 indicates the magnitude of the arc current flowing in the main circuit 170, a curve 940 indicates the magnitude of the current flowing in the bypass circuit, and a curve 950 indicates the magnitude of the fault current. As can be seen from the graph, the arc current in the main circuit 170 decreases while the current flowing in the bypass circuit increases from time t1 to time t2.

Subsequently, the second switch 120 is opened, and then the semiconductor module 130 is turned off. When the second switch 120 is opened and the semiconductor module 130 is turned off, a fault current flows in the capacitor 140. The fault current flowing in the capacitor 140 charges the capacitor 140, and the voltage across the charged capacitor 140 may remain constant. Referring to FIGS. 8 and 10, the fault current flowing through the capacitor 140. The magnitude of the fault current at this time is indicated by the curve 960.

After the capacitor 140 is charged, the voltage across the capacitor 140 is applied across the surge arrester 150. When the voltage across the capacitor 140 is applied, the resistance of the surge arrester 150 may become zero. When the resistance of the surge arrester 150 becomes zero, the terminals of the surge arrester 150 are shorted, such that all the fault current flows through it. When a certain amount of the fault current exits through the surge arrester, the voltage across the arrester decreases, and thus the resistance of the arrester becomes infinite ($\infty$). As a result, the fault current no longer can flow through the arrester 150 and thus is blocked.

According to an exemplary embodiment of the present disclosure, the fast switches are used to block a current, and thus the semiconductor module can be protected. In addition, according to an exemplary embodiment of the present disclosure, the number of power semiconductors can be reduced by using a bypass circuit to block a current.

In addition, according to the exemplary embodiment of the present disclosure, by utilizing the bypass circuit to block the current, the volume of the current circuit breaker can be reduced and the manufacturing cost can be reduced. In addition, according to an exemplary embodiment of the present disclosure, heat generation can be suppressed by using the bypass circuit to block a current.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A current circuit breaker comprising:
   a first switch configured to be opened upon a fault current being generated;
   a second switch having an end connected to the first switch and configured to be opened after a predetermined period of time elapses since the first switch has been opened;

a semiconductor module having an end connected to the first switch and another end connected to another end of the second switch;

a capacitor having a terminal connected to the second switch and the other terminal connected to the semiconductor module; and a surge arrester connected across the capacitor and configured to change its resistance according to a voltage across the capacitor to block the fault current, wherein the second switch and the semiconductor module are connected to each other in series, wherein the second switch and the semiconductor module are connected to the first switch in parallel, and wherein the semiconductor module is configured to control a fault current therethrough in two directions.

2. The current circuit breaker of claim 1, wherein the semiconductor module is turned on when the first switch is opened, and the second switch is opened when the semiconductor module is turned on.

3. The current circuit breaker of claim 1, wherein the predetermined period of time is in proportion to a stroke of the first switch.

4. The current circuit breaker of claim 1, further comprising:

a control unit configured to determine whether the fault current is generated, and to generate a control signal to open the first switch or the second switch if it is determined that the fault current is generated.

5. The current circuit breaker of claim 4, further comprising:

a sensor configured to detect if the first switch is open, wherein the control unit receives a signal indicating that the first switch is completely open from the sensor and then generates a control signal to open the second switch.

* * * * *